Patented Aug. 17, 1943

2,326,936

UNITED STATES PATENT OFFICE 2,326,936

PROCESS OF PRODUCING CHOLESTEROL CONVERSION PRODUCTS CONTAINING SULPHUR

Herbert Fiedler, Karl Heimig, and Helmut Liesegang, Leipzig, Germany; vested in the Alien Property Custodian No Drawing. Application October 15, 1940, Serial No. 361,330. In Germany October 9, 1939

2 Claims. (Cl. 260—125)

The invention relates to the production of cholesterol conversion products containing sulphur and having therapeutically and cosmetically valuable properties.

According to the invention, these conversion products containing sulphur are produced by heating cholesterols, for example cholesterol itself, isocholesterol or oxycholesterol or mixtures of materials containing cholesterols, as for example wool fat or wool wax (hereinafter referred to as "natural wool esters") with sulphur or substances giving off sulphur, for which purpose preferably there may be used solvents or diluents, such as alcohol, gasoline, benzene, glycerine, or the like.

For example, if isocholesterol is mixed with an equal quantity of sulphur in pulverulent form and in the presence of double the quantity of glycerine and is heated to 200 degrees C. while being stirred, and is then cooled while stirring, there results, after taking up with ether and after distilling off the ether, a dark brown viscous residue solidifying after 24 hours to a vitreous substance containing 8.2% of organically combined sulphur.

The nature of the conversion products obtained by the process according to the invention, which are especially distinguished by an approximately 50% higher iodine valency, could not be determined with accuracy up to now, but it may be assumed, according to the behaviour of these substances which are distinguished by a high reducing and oxidizing capacity, that thiophene-like compounds are formed.

The sulphurous conversion products of cholesterols are of special importance owing to their contents of sulphur, since the properties of the sulphur are combined in a favourable manner with the skin-nourishing properties of cholesterols.

For example, they may be used for dermatopathic purposes, for the manufacture of creams, ointments, and the like, or also for manufacturing, for example, cosmetic powders.

The yields are considerably increased by using high temperatures, for example 200 to 220 degrees C., and by employing solvent mediums, such as glycerine.

The mixtures containing cholesterols used in the process according to the invention may be such mixtures whose other constituents do not react with sulphur. For example, the product known as Vasenol is suitable as starting material.

Example

Cholesterol, wool fat, or wool wax is mixed with an equal quantity of sulphur and is taken up by double the quantity of glycerine. The mixture is heated to 200 to 220 degrees C. and, while being constantly stirred, is cooled to room temperature. By taking up the reaction product with a solvent, the un-combined portion of sulphur is removed, and after distilling off the solvent, the sulphur preparation suitable for immediate ulterior manufacture is obtained.

What is claimed is:

1. A process for producing a sulphur-containing cholesterol conversion product, which comprises mixing cholesterol with glycerine and with free sulphur, and heating at 200–220° C. with agitation.

2. A process of producing a material including a sulphur-containing cholesterol conversion product which comprises mixing a natural wool ester with a substantially equal quantity of sulphur and substantially double the quantity of glycerine, and heating at 200–220° C. with agitation.

HERBERT FIEDLER.
KARL HEIMIG.
HELMUT LIESEGANG.